J. HARTMANN
Plows.
No. 151,776.
Patented June 9, 1874.
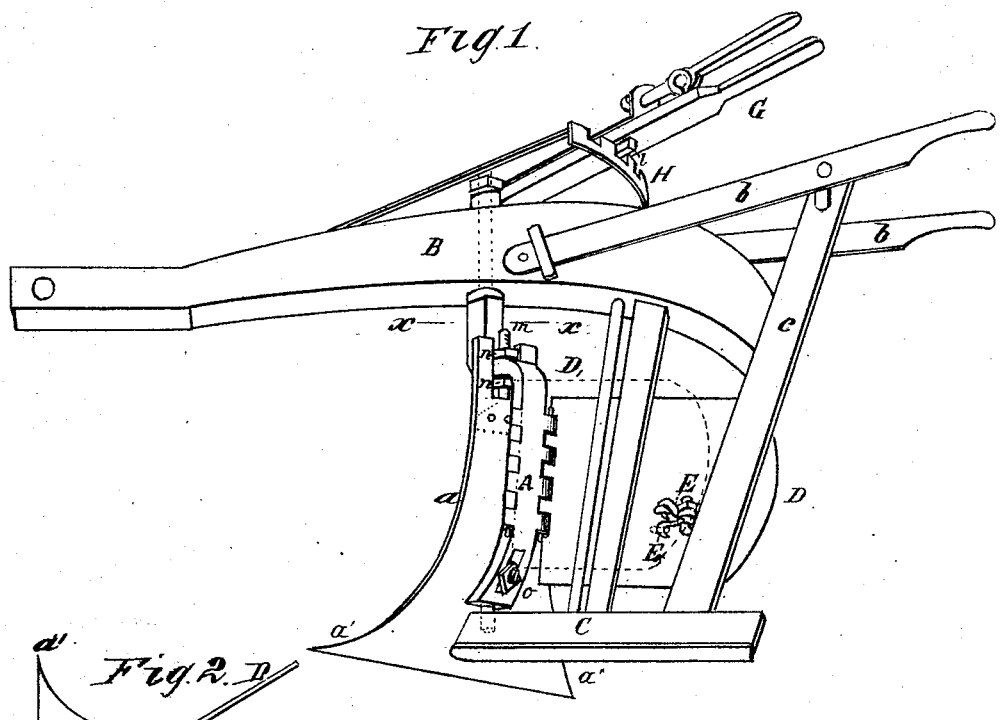
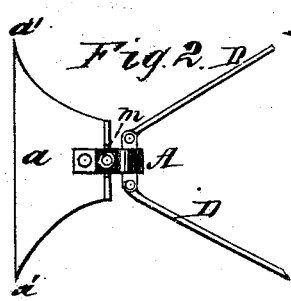
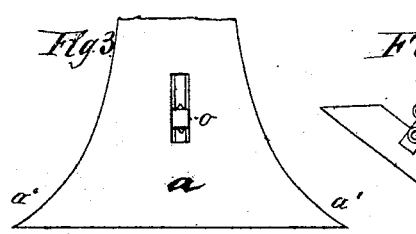
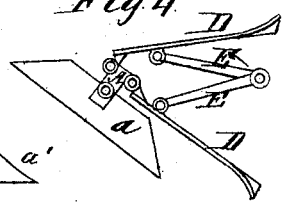

UNITED STATES PATENT OFFICE.

JULIUS HARTMANN, OF JEFFERSON COUNTY, KENTUCKY.

IMPROVEMENT IN PLOWS.

Specification forming part of Letters Patent No. 151,776, dated June 9, 1874; application filed October 14, 1873.

*To all whom it may concern:*

Be it known that I, JULIUS HARTMANN, of the county of Jefferson and State of Kentucky, have invented a new and Improved Plow, of which the following is an exact description, reference being had to the annexed drawings.

The invention relates to the combination of a cranked and journaled shaft, hinged mold-boards or wings, and a share attached to said shaft so as to be adjustable with the wings at various angles, as and for the purpose hereinafter described.

In the accompanying drawing, Figure 1 is a perspective side view of the plow; Fig. 2, a section on the line $x\ x$ of Fig. 1; and Fig. 3, a face view of a fragment of the adjustable share. Fig. 4 shows the position of the shaft, share, and mold-boards when adjusted for turning a furrow.

The beam B, handles $b$, and rear standard $c$ are arranged in a well-known manner. The standard joins at the bottom a bar, C, which forms the heel of the plow. The wings or mold-boards D are hinged to a shaft, A, which is stepped in the front end of the bar C, and passes vertically through the beam. They are also connected to the standard $c$ by pivoted links or arms E. The shaft is bent at a right angle, or thereabout, a short distance below the beam, and is curved slightly from thence forward and downward, corresponding to the curve of the share $a$. The latter is essentially fan-shaped in its general outline, and is notched at its narrow top to adapt it to the shaft A. It is attached to the shaft by screw-bolts $m$ and $o$, the former of which passes up through the bent portion of the shaft, and has screw-nuts $n$, and the latter through a vertical slot in the lower part of share and shaft. Thus the share may be adjusted downward as the points $a'$ and lower edge wear away. The lever G is used to adjust the shaft A and share $a$ at the desired angle, which is done by turning the lever to the right or left. The lever is locked in position by a spring-catch, $l$, which engages a notched arc-bar, H.

The plow may be used to open a trench or furrow, or for cultivating certain kinds of crops, when the share and wings stand in the position indicated in Fig. 2; but by turning the share either to the right or the left it will cause a change in the position of the wings, so that one of them will lie parallel with the beam, and the other stand at a large angle to it, corresponding respectively to the position of the land-side and mold-board in the ordinary plow. The greater the angle or inclination of the share to the beam, the more land taken or the wider the furrow made; but whatever be the angle, the side or edge of the share acts as a colter in cutting or dividing the soil. Fig. 4 shows the adjustment of parts for turning a furrow to the left.

The plow is particularly adapted for use on hill-sides or steep inclinations, and is easily handled and adjusted for different kinds of work.

Having thus described my invention, what I claim is—

The combination of the share $a$, the mold-boards or wings, the cranked and journaled shaft A, and an adjusting device, said wings being hinged to the shaft and connected to the standard by the pivoted links E, all substantially as shown and described.

JULIUS HARTMANN.

Witnesses:
HENRY I. SONTAG,
C. C. HARTMAN.